(12) United States Patent
Bell

(10) Patent No.: US 6,490,764 B1
(45) Date of Patent: Dec. 10, 2002

(54) ANTI-ROPING LATCH PLATE

(75) Inventor: Steven C. Bell, Rochester, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/456,448

(22) Filed: Dec. 8, 1999

(51) Int. Cl.[7] ............................................. A44B 11/26
(52) U.S. Cl. ........................................... 24/198; 24/633
(58) Field of Search ....................... 24/198–200, 163 R, 24/633

(56) References Cited

U.S. PATENT DOCUMENTS

| | | | |
|---|---|---|---|
| 3,941,419 A | * | 3/1976 | Blom |
| 3,982,769 A | * | 9/1976 | Farlind |
| 4,023,826 A | | 5/1977 | Kokubo et al. |
| 4,527,313 A | * | 7/1985 | Sylven et al. |
| 4,935,994 A | * | 6/1990 | Boone et al. |
| 5,050,274 A | * | 9/1991 | Staniszewski et al. |
| 5,222,278 A | | 6/1993 | Ball et al. |
| 5,548,874 A | * | 8/1996 | Mishina et al. |
| 5,908,223 A | * | 6/1999 | Miller |
| 5,984,358 A | * | 11/1999 | Mar et al. |

* cited by examiner

*Primary Examiner*—James R. Brittain
(74) *Attorney, Agent, or Firm*—Markell Seitzman

(57) ABSTRACT

A latch plate for use with a seat belt and seat belt buckle, the latch plate comprising: a metal load-bearing plate including a generally flat tongue engageable with a locking feature of the seat belt buckle, a first portion of the bearing plate, rearward of the tongue, having a first surface, the first surface including a lateral extending rearward edge; the bearing plate, in a second portion thereof, including an integrally formed tab having a laterally extending forward edge, the forward edge of the tab overlaying the rearward edge of the first surface, the tab being spaced a determinable distance from the first surface defining a thin channel or opening therebetween through which the seat belt is received, the distance being sufficiently narrow to lessen the likelihood of the seat belt becoming twisted in the channel.

14 Claims, 9 Drawing Sheets

ANTI-ROPING LATCH PLATE

BACKGROUND AND SUMMARY OF THE INVENTION

The invention generally relates to safety restraint devices and more particularly to an anti-roping latch plate.

Reference is made to FIGS. 1 and 2, which illustrate a prior art latch plate 20. The latch plate comprises a tongue portion 22 having a first latching feature 24 such as an opening, which is engageable by a locking mechanism of a buckle. The latch plate 20 further includes a rear or plate portion 26 having an oblong opening 28 of sufficient size to permit the seat belt 30 to extend therethrough. The rearward end 26a of plate 26 is often bent away from the plane of the tongue as illustrated in FIG. 2. While not illustrated, to reduce the wear on the seat belt 30, the latch plate 20 in the vicinity of opening 28 may be covered by a low-friction plastic coating.

Over time as the vehicle occupant buckles and unbuckles the seat belt about his or her body, the seat belt often curls upon itself or otherwise twists in the opening 28. In the industry, this curling, twisting, or folding of the seat belt is called "roping."

It is an object of the present invention to provide a seat belt that is less prone to roping.

Accordingly the invention comprises: a latch plate for use with a seat belt and seat belt buckle, comprising: a metal load-bearing plate including a tongue engageable with a locking feature of the seat belt buckle, the load-bearing plate also defining a belt receiving opening located between first and second generally parallel surfaces, the first and second parallel surfaces defining a channel to guide the seat belt as it exits the belt receiving opening.

Many other objects and purposes of the invention will be clear from the following detailed description of the drawings.

DETAILED DESCRIPTION OF THE DRAWINGS

Figure 1:
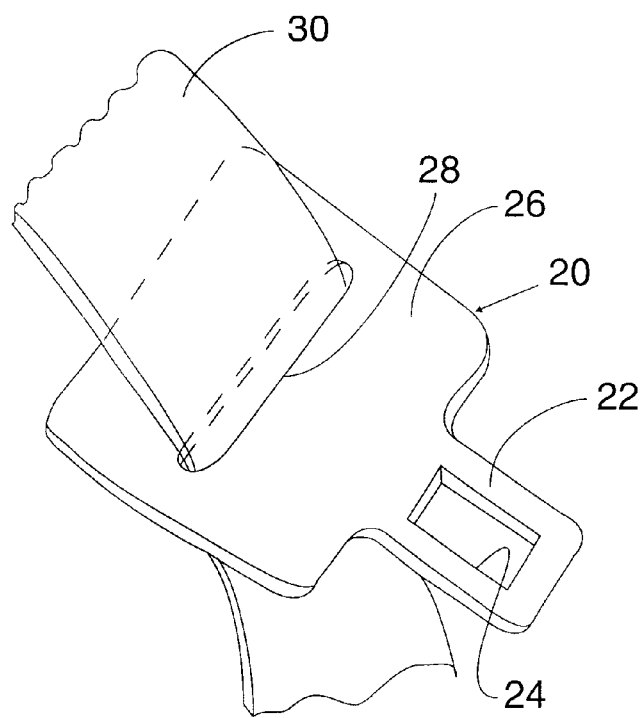
FIGS. 1 and 2 illustrate a prior art latch plate.
Figure 2:
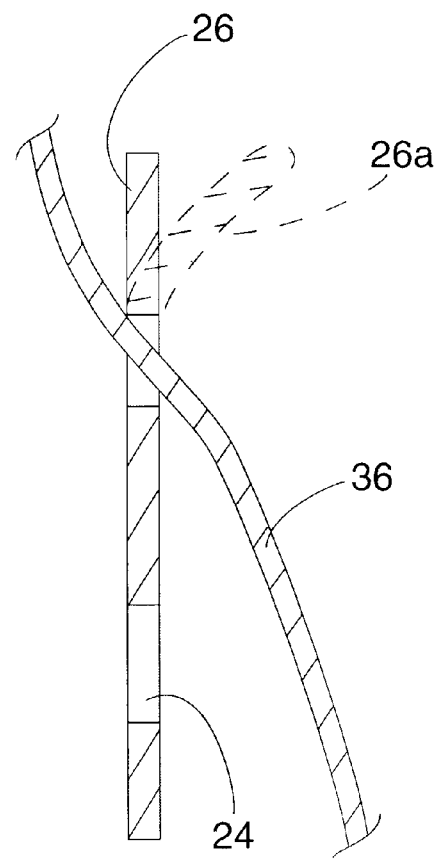
Figure 3:
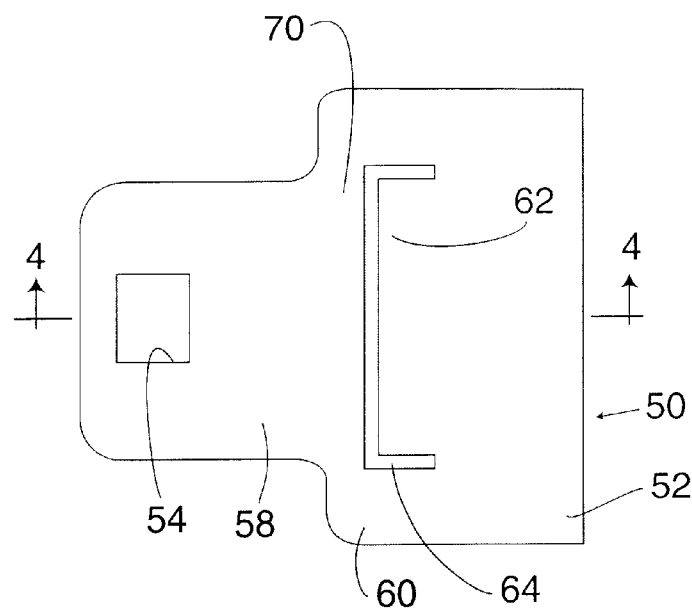
FIG. 3 is a top plan view of a load-bearing plate.
Figure 4:
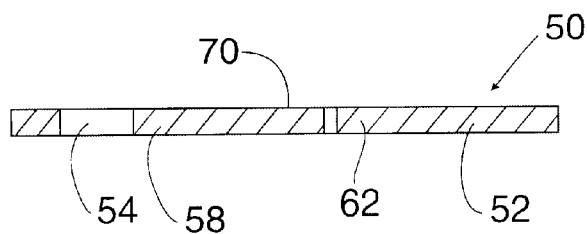
FIG. 4 is a cross-sectional view through section 4—4 of FIG. 3.
Figure 14:
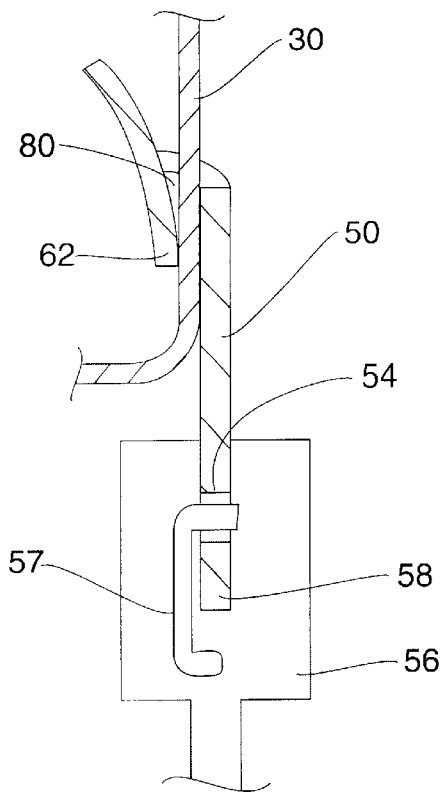
FIG. 14 diagrammatically shows the latch plate of the present invention secured to a seat belt buckle.

Reference is made to FIGS. 3 and 4, which illustrate a load-bearing plate 52, which comprises the major component of a latch plate 50. The plate 52 includes a first locking feature 54 such as an opening, which is engageable with a latch mechanism 57 of a buckle 56 shown in FIG. 14. FIG. 14 diagrammatically shows the buckle 56 with a rotatable latch mechanism, which lockingly engages the latch plate 50.

The opening or locking feature 54 in plate 52 is formed within a tongue 58 portion of the plate 52. The load-bearing plate 52, in a rearward, second portion 60 thereof, includes an integrally formed tab 62. The tab is formed by stamping or otherwise forming a narrow U-shaped slot 64 in the plate 52. The plate includes a first surface 70 that is positioned forward of the slot 64. In the first preferred embodiment of the invention, this first surface 70 is flat.

Figure 5:
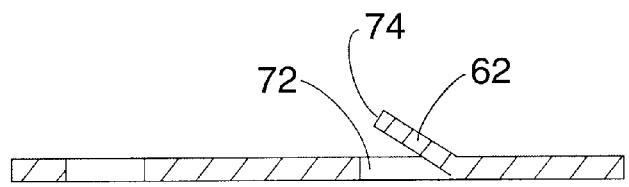
FIG. 5 is a cross-sectional view of the plate with a tab rotated upwardly taken through section 5—5 of FIG. 6.
Figure 6:
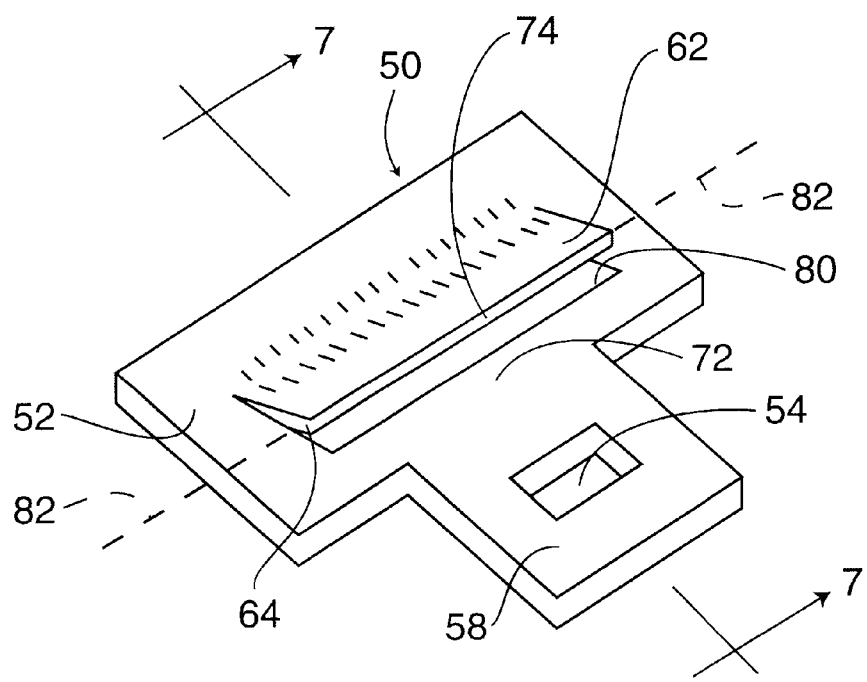
FIG. 6 is an isometric view of the load-bearing plate of FIG. 5.
Figure 7:
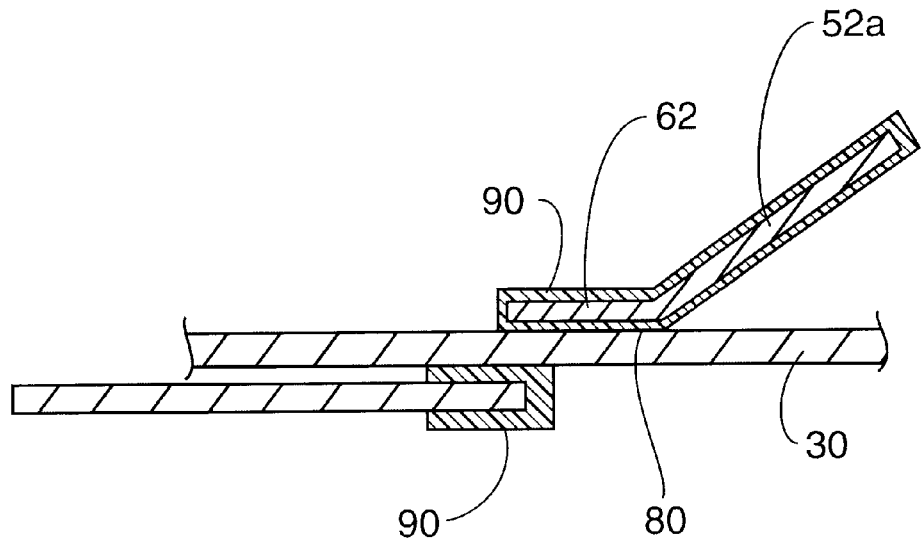
FIG. 7 is a cross-sectional view through section 7—7 of FIG. 8 and includes a plastic coating on portions of the plate.
Figure 8:
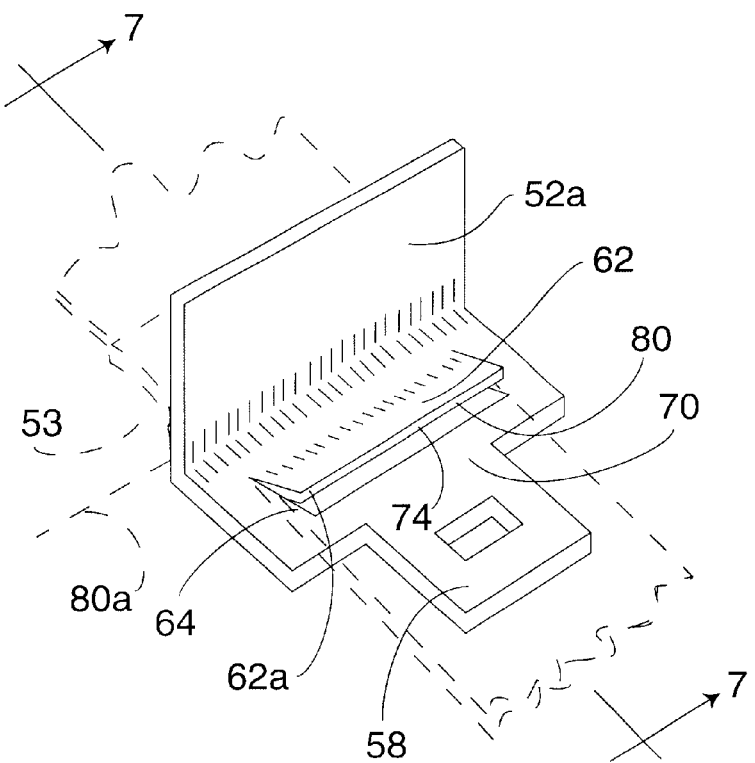
FIG. 8 is an isometric view of a latch plate according to the present invention, however, this figure does not include the plastic coating shown in FIG. 7.
Figure 8A:
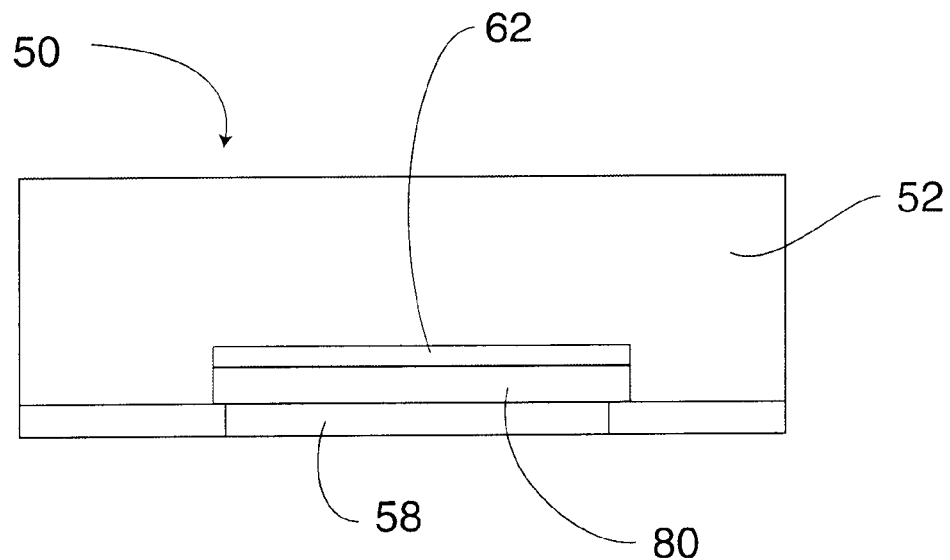
FIG. 8a is a front plan view of a load-bearing plate.

Subsequent to forming the opening 54 and the slot 64, the tab 62 is rotated upwardly as illustrated in FIGS. 5 and 6. The rear laterally extending edge 72 of the first surface and the forward edge 74 of the tab are more clearly visible in FIG. 6. As can be appreciated, with the tab bent as illustrated, the edge 74 is positioned apart from edge 72 defining a channel 80 therebetween. Subsequently, the plate 52 is bent (see FIGS. 7 and 8) about bend line 82 thereby positioning a rear portion 52a of plate 52 at an angle relative to the tongue 58. This rotation of the plate 52 moves the forward edge 74 forwardly closer to the tongue 58. Depending upon the location of the fold line and the dimensions of the tab, the forward edge 74 of the tab will be moved in line with the rearward edge 72 or be positioned slightly forward of the rearward edge to overlay the first surface 70. The resulting configuration is shown in FIG. 8. In this configuration, the tab 62 is preferably parallel to the first surface 70, as can also be seen in FIG. 8a.

FIG. 8 also shows the seat belt 30, in phantom line, extending through the latch plate 50 and more particularly extending through the channel 80.

As can be appreciated from the above, the seat belt 30 is now guided between two parallel walls, the first formed by the first surface 70 and the second formed by the lower surface 62a of the tab 62. The roping, i.e., twisting, curling, etc. of the seat belt 30 is now at a minimum because of the close spacing of the channel to the seat belt and its parallel construction. These walls are preferably parallel but can diverge +/−10 degrees from parallel. The latch plate 50 of FIG. 8 is fully functional, however, as mentioned above, latch plates typically include a low-friction elastomeric coating positioned about the various parts of a metal load-bearing plate to protect the seat belt 30. FIG. 7 shows this coating 90 positioned on the first surface and about edge 72 as well as about rearward portion 52a of the plate 52. FIG. 7 also illustrates the seat belt fitted through channel 80, which in this case is defined by the spacing between the adjacent upper and lower layers of the coating material 90.

Figure 8B:
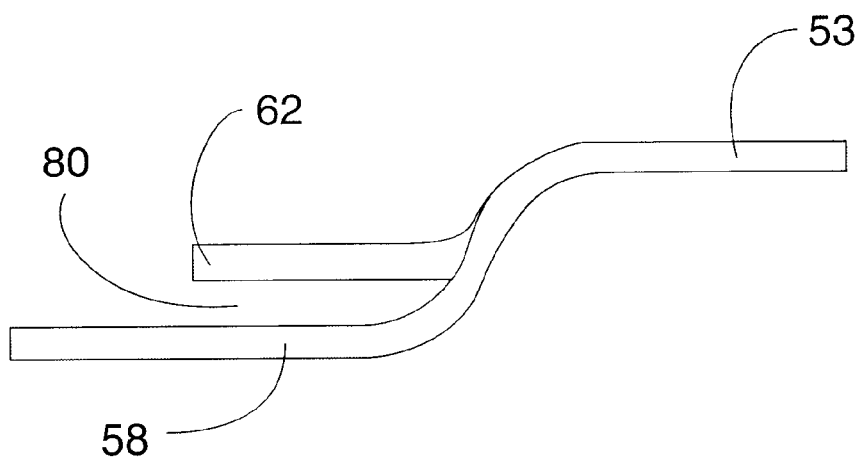
FIG. 8b shows a further embodiment of the invention.

In certain applications, it might be desirable to limit the extent to which the rear portion 52a extends outwardly from the tongue 58. If this alternate configuration is desirable, the rear portion 52a is again bent about a second bend line 80a, which places the rearmost portion 53 (shown in phantom line in FIG. 8) of the plate 52 in an orientation generally parallel to that of the tongue 58. This configuration is also shown in FIG. 8b.

Figure 10:
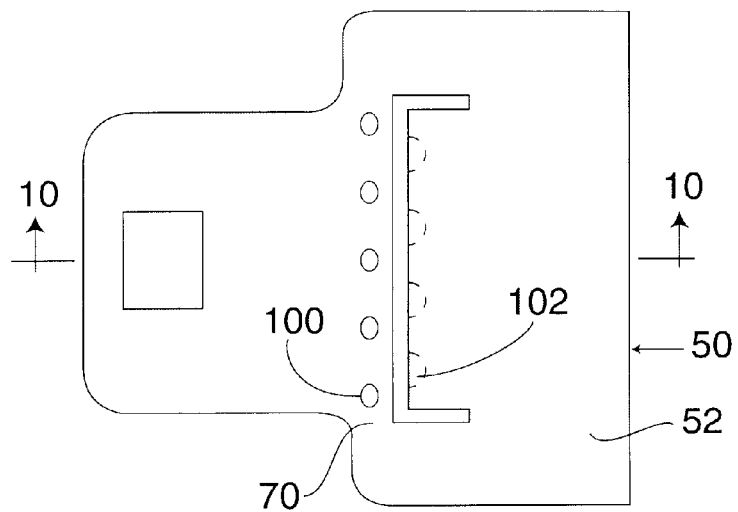
FIGS. 10–13 illustrate another embodiment of the present invention.
Figure 9:
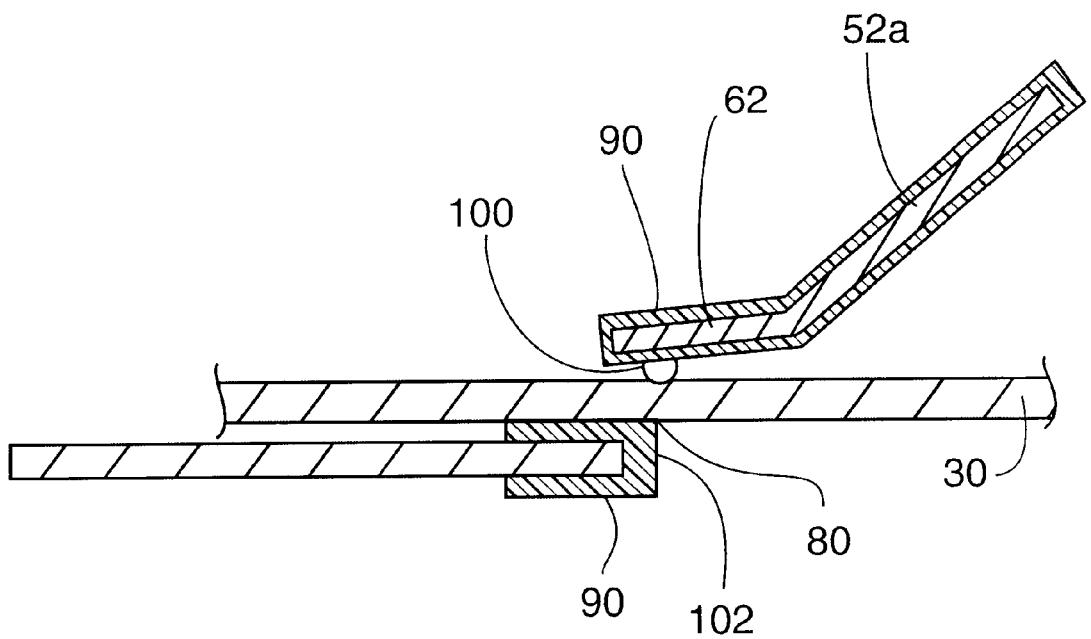
FIGS. 9 and 9a show an alternate embodiment of the invention.
Figure 9A:
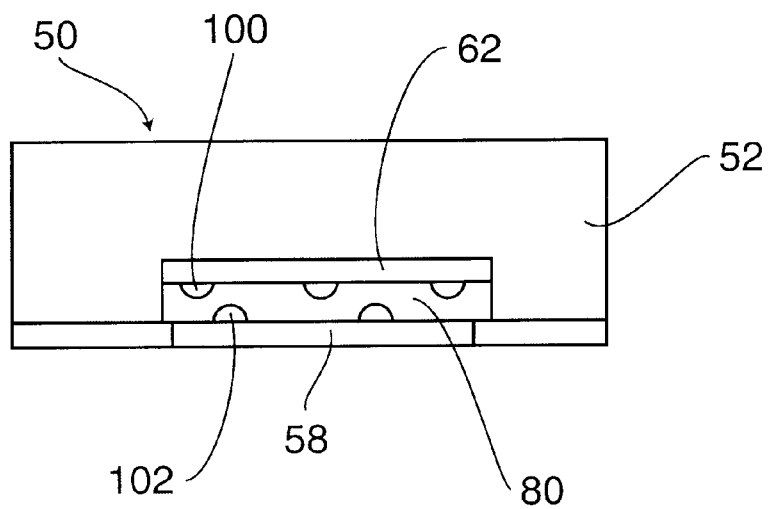
Figure 11:
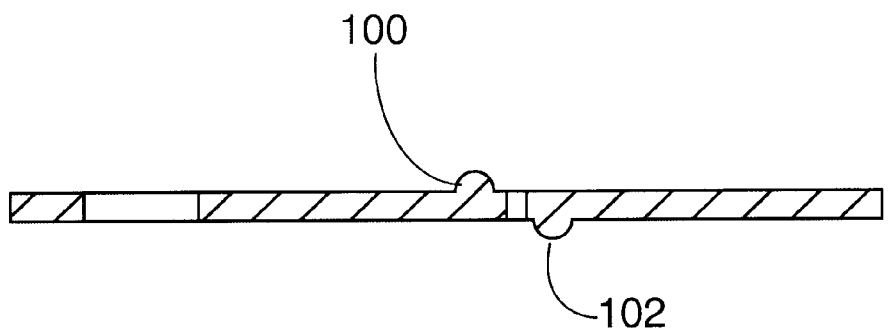
Figure 12:

Reference is briefly made to FIGS. 9 and 9a, as well as FIGS. 10–12, which illustrate two additional preferred embodiments of the invention. The channel 80 in the earlier embodiment is formed by two flat surfaces 62a and 70, which are coated with a thin layer of plastic material. In the following embodiments the channel 80 includes a plurality of separated projections.

FIG. 9 is identical to FIG. 7 with the exception that the plastic coating on surfaces 62a and 70 is molded to provide a plurality of respective projections 100 and 102. FIG. 9a is a front view of the latch plate, without the seat belt therein, and shows the relationship between the alternating projections on each of the above surfaces. The projections 102 can for example be circular and/or oblong.

Figure 13:
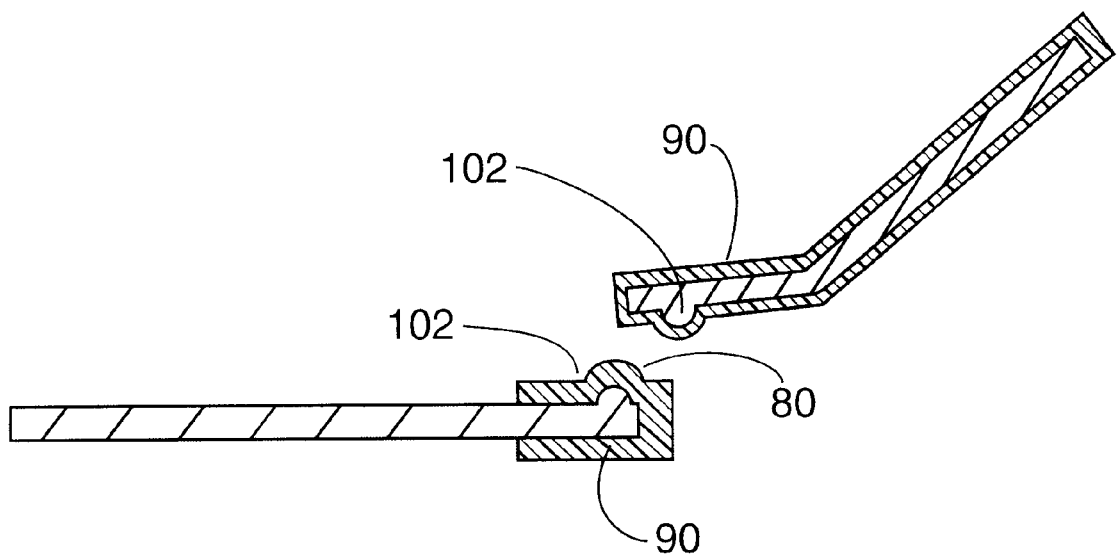
Figure 13A:
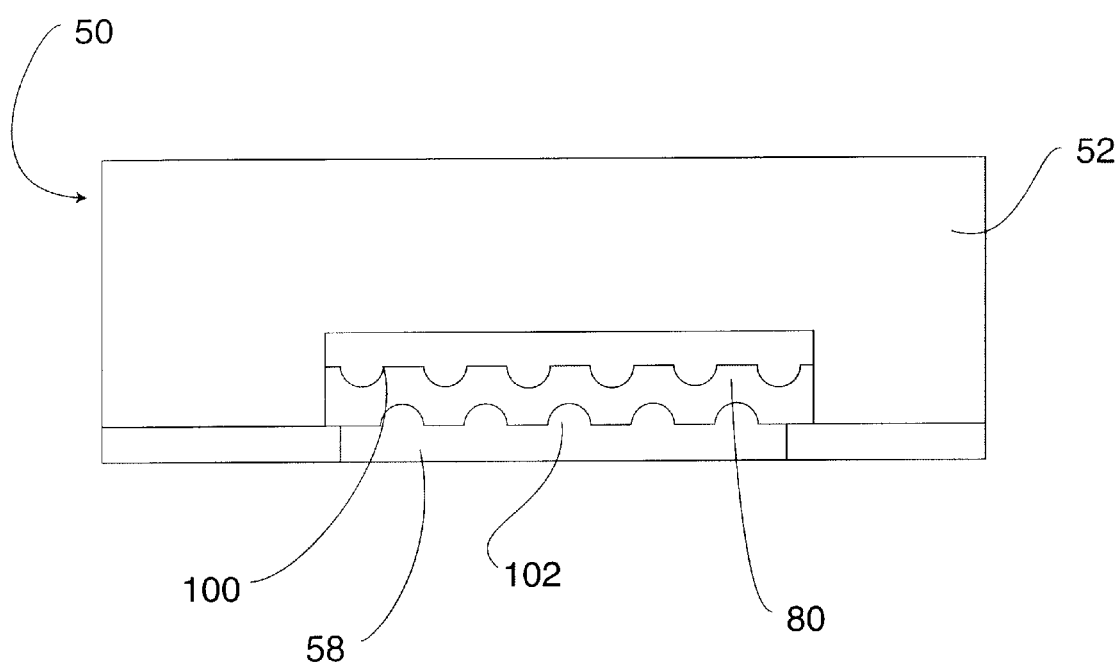
FIG. 13a is a front plan view of an alternate embodiment of the invention.

As mentioned above, the first surface 70 can be flat. However, in the following embodiment, one or more projections 100 are provided on the first surface 70. Alternatively, or in combination with the projections 100, another plurality of projections 102 are also located on the undersurface 62a of the tab. FIG. 10 is a plan view of the load-bearing plate 52 illustrating a plurality of hemispherically-shaped projections 100 on the first surface 70 and, for the purpose of illustration, oblong-shaped projections 102 on the tab 62. These projections can easily be formed during the stamping process during which the latch plate 50 is formed. FIG. 11 is a cross-sectional view taken through section line 11—11 of FIG. 10 and shows the relationship between the projections 100 and 102 prior to the bending of the tab 62 upwardly (as in FIG. 12). In this alternate embodiment, after the tab 62 is bent upwardly, the plate 52 is bent in the manner as described in relation to FIGS. 6 and 8. The resulting configuration is illustrated in FIG. 13. FIG. 13 also shows the coating material 90, which now also covers the projections 100 and 102. FIG. 13a is a front plan view of this alternate latch plate showing the relationship of the projections 100 and 102, as well as the channel 80 through which the seat belt 30 is received.

Figure 15:
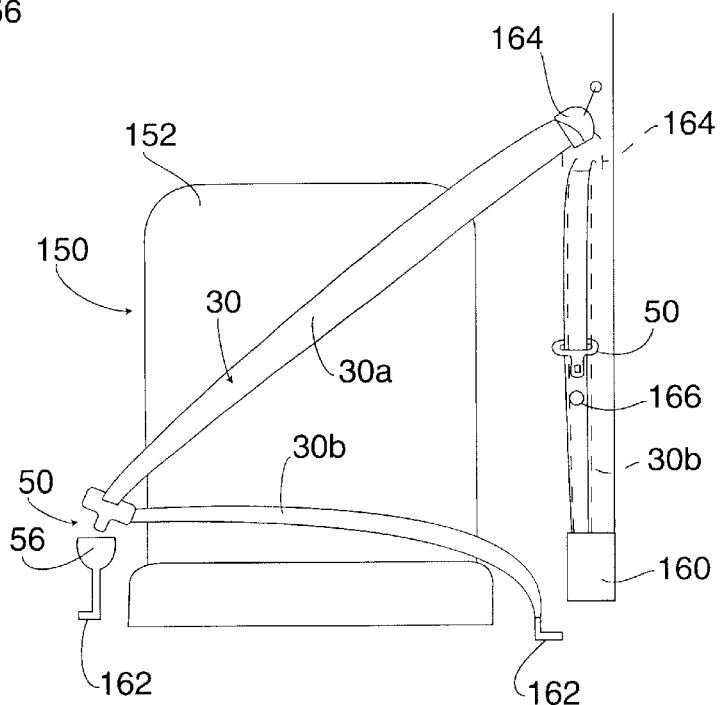
FIG. 15 illustrates a typical three-point seat belt system.

Reference is now made to FIG. 15, which illustrates a typical three-point seat belt system 150. The system 150 comprises a seat belt retractor 160 of known variety. Extending from the retractor 160 is the seat belt, which is divided into a shoulder belt portion 30a and a lap belt portion 30b. The latch plate 50 of the present invention essentially divides the seat belt 30 into the shoulder belt and lap belt portions. The remote end of the lap belt is secured, such as to the floor, by an anchor 162. The buckle 56 is similarly secured by another anchor 162. The seat belt is also threaded through a web guide or D-ring 164. When the latch plate 50 is detached from the buckle 56 the retractor 160 will rewind the seat belt 30 onto a spool (not shown) of the retractor 160. In this configuration, the lap belt portion 30b will be vertically oriented and extend downwardly from the web guide 164. In the stowed configuration, the web guide 164 is also vertical and is shown in this configuration in phantom line.

Depending on the relative size of the height of the channel 80 and relation to the thickness of the seat belt 30, the latch plate 50 will fall into one of two categories of latch plates, that is a free-sliding latch plate or a free-falling latch plate. If the channel 80 is narrow, as in the free-sliding latch plate, the seat belt will generate a low level of friction on the latch plate such that upon retraction of the seat belt into the retractor, the unbuckled latch plate 50 will be carried with the seat belt to its stowed position (shown in phantom line in FIG. 15). Quite often the latch plate will be carried up to the web guide and as the retractor continues to retract, the seat belt will be pulled through the latch plate which has come to rest at the location of the web guide. The free-sliding latch plate may slide down the vertically stowed seat belt when it is not in use. In the case of the free-falling latch plate, the size of the channel 80 is slightly oversized so that when the latch plate is unbuckled from the buckle, the latch late may initially be carried upwardly with the retracting seat belt but, due to the lower level of friction, the latch plate will fall down to the position of a stop with the seat belt in its vertically stowed orientation. The stop is usually achieved by adding a small button 166 or the like to the seat belt.

Many changes and modifications in the above-described embodiment of the invention can, of course, be carried out without departing from the scope thereof. Accordingly, that scope is intended to be limited only by the scope of the appended claims.

What is claimed is:

1. A latch plate (50) for use with a seat belt and seat belt buckle, the latch plate comprising:
   a metal load-bearing plate (52) including a tongue engageable with a locking feature (54) of the seat belt buckle,
   a first portion of the load-bearing plate, rearward of the tongue (58), having a first surface, the first surface (70) including a lateral extending rearward edge (72);
   the load-bearing plate, in a second portion thereof, including an integrally formed tab (62) having a laterally extending forward edge (74), the forward edge of the tab overlaying the rearward edge (72) of the first surface, the tab being spaced a determinable distance from the first surface defining a thin channel or opening (80) therebetween through which the seat belt is received, the distance being sufficiently narrow to lessen the likelihood of the seat belt becoming twisted in the channel.

2. The latch plate as defined in claim 1 wherein the first surface is flat.

3. The latch plate as defined in claim 1 wherein one of the first surface and the tab is generally flat and includes a plurality of upraised projections thereon.

4. The latch plate as defined in claim 3 wherein the projections are one of hemispherical and oval.

5. The latch plate as defined in claim 1 wherein the tab is generally parallel to the first surface.

6. The latch plate as defined in claim 1 wherein the at least facing portions of the tab and the first surface, in the vicinity of the channel, are covered by a low friction, elastomeric coating to permit a latch to easily slide upon the seat belt.

7. The latch plate as defined in claim 5 wherein the coating, within the channel, includes a plurality of projections projecting into the channel.

8. The latch plate as defined in claim 7 wherein adjacent projections on the flat surface and on the tab alternate.

9. The latch plate as defined in claim 1 wherein the first surface of the load-bearing plate and the tongue lie in the same plane.

10. The latch plate as defined in claim 1 wherein a third portion of the bearing plate, rearward of the second portion, is elevated relative to the tongue.

11. The latch plate as defined in claim 1 wherein the load-bearing plate includes a thin U-shaped slot immediately rearward of the first surface, the U-shaped slot forming the tab, the rearward edge of the first surface and the forward edge of the tab.

12. The latch plate as defined in claim 11 wherein the tab is initially bent at an angle away from the plane of the tongue, and wherein the bearing plate is bent in the vicinity of the slot to position the forward edge of the tab to overlay the rearward edge of the first surface.

13. A latch plate (50) for use with a seat belt and seat belt buckle, the latch plate comprising:
   a load-bearing plate (52) including a tongue engageable with a locking feature (54) of the seat belt buckle,
   a first portion of the load-bearing plate, rearward of the tongue (58), having a first surface, the first surface (70) including a lateral extending rearward edge (72);

the load-bearing plate, in a second portion thereof, including an integrally formed tab (62) having a laterally extending forward edge (74), the forward edge of the tab being spaced a determinable distance from the first surface defining a thin channel or opening (80) therebetween through which the seat belt is received, the distance being sufficiently narrow to lessen the likelihood of the seat belt becoming twisted in the channel.

14. A latch plate (50) for use with a seat belt and seat belt buckle, the latch plate comprising:

a metal load-bearing plate (52) including a tongue engageable with a locking feature (54) of the seat belt buckle, a first portion of the load-bearing plate, rearward of the tongue (58), having a first surface, the first surface (70) including a lateral extending first edge (72);

the load-bearing plate, in a second portion thereof, including an integrally formed tab (62) having a laterally extending second edge (74), the second edge overlaying the first edge (72) of the first surface, the tab being spaced a determinable distance from the first surface defining a thin channel or opening (80) therebetween through which the seat belt is received, the distance being sufficiently narrow to lessen the likelihood of the seat belt becoming twisted in the channel.

* * * * *